United States Patent Office 3,009,907
Patented Nov. 21, 1961

3,009,907
RECOVERY AND PURIFICATION OF
POLYOLEFINS
Bert H. Mahlman, West Chester, Pa., and Harold M. Spurlin, Wilmington, Del., assignors to Hercules Powder Company, Wilmington, Del., a corporation of Delaware
No Drawing. Filed Sept. 8, 1958, Ser. No. 759,438
8 Claims. (Cl. 260—93.7)

This invention relates the purification of polyolefins produced by the low pressure process and more particularly to the purification process in which an alcohol is added to the reaction mixture to stop the catalyst and aid in its removal and an alkaline solution is added to wash out the catalyst residues from the polymer.

More particularly this invention relates to the low pressure process for polymerization of olefins in which the catalyst is a composition resulting from admixture of a titanium compound and an organoaluminum compound wherein the metals which are to be removed from the product are titanium and aluminum. The polymerization process is usually carried out by mixing the two catalyst components in a saturated hydrocarbon diluent and adding olefins to be polymerized to the catalyst mixture at atmospheric or slightly elevated pressure and at ambient temperature or moderately elevated temperatures. When ethylene, propylene or higher olefin is polymerized, a highly crystalline polymer is obtained which has many important industrial uses. The polymer forms on the catalyst surface and builds up as a granule with catalyst dispersed therein. The polymer granules are insoluble in the reaction medium and form a slurry from which the granules could be readily separated by any of the usual means such as filtration, centrifugation, decantation, etc. However, the polymer granules so produced contain catalyst residues which detrimentally affect not only the color of the polymer, particularly when molded, but also the electrical properties, particularly the electrical insulating properties. The removal of these catalyst residues by washing with mineral acids has been shown to be inadequate and to be unsatisfactory because of corrosion of equipment. The removal of catalyst residues by steeping in an alcohol and then adding aqueous caustic was an improvement which removed the objection to corrosion. However, in this process the solid polymer and the precipitated metal hydroxides not soluble in the alkaline solution must be separated by processes taking advantage of differences in particles size of the granules and the metal hydroxides. In effecting separation by filtration on a filter cloth which holds the polymer granules but not the metal hydroxides, there is initial success but the metal hydroxides build up on reuse of the filter cloth and slow down the filtration and cause the ash content of the polymer adjacent the cloth to become sufficiently high to contaminate the batch. It is the purpose of the present invention to bring about more effective separation of the polymer granules from these catalyst residues.

Now in accordance with the present invention it has been found that granular polymers produced in the process of polymerizing an ethylenically unsaturated hydrocarbon with a catalyst comprising a titanium compound and an organoaluminum compound in a medium consisting essentially of an inert solvent are more readily rendered essentially free of the metals of the catalyst and catalyst residues by steeping the granular polymer in a slurry of the inert solvent with an aliphatic alcohol of 1 to 18 carbon atoms (preferably 4–10 carbon atoms) to form a complex solution of the catalyst dispersed in the slurry and in the polymer granules, and then contacting the slurry with a solution of an alkali metal hydroxide and an alkali metal salt of an organic acid of the group consisting of gluconic acid, tartaric acid, and citric acid in water to form a solution of the metals from which the polymer is separated. The catalyst residues dissolve or disperse in the aqueous alkaline solution which forms a liquid phase readily separable from the solid phase and from the liquid inert solvent phase used as diluent in the polymerization process. The polymer granules which separate as the solid phase are much more readily filtered free of the catalyst residues and the polymer is thus lower in ash and far superior for many uses as a result.

This method of removing the catalyst residues may be applied to the solid polymer produced in the polymerization of any olefin with the titanium compound-organoaluminum catalyst system. Thus any ethylenically unsaturated hydrocarbon or mixtures thereof may be polymerized to a solid polymer and then purified by the process of this invention. Exemplary of the ethylenically unsaturated hydrocarbons which may be polymerized solid polymers which can be purified in accordance with this invention are the linear 1-olefins such as ethylene, propylene, butene-1, octadecene-1, and dodecene-1, 3-methyl butene, 4-methyl pentene, styrene and vinyl cyclohexene.

In accordance with the low pressure polymerization process, the olefin is contacted at relatively low pressure and temperature with a catalyst prepared by mixing a titanium compound with an organoaluminum compound. The titanium compound is preferably a halide but may be an oxyhalide or an organic salt or complex. The organoaluminum compound is a compound in which an organic hydrocarbon radical is attached directly to aluminum, such as alkyl aluminum or alkyl aluminum halides. Examples of the titanium compounds are $TiCl_4$, $TiBr_4$, $TiF_4$, titanium acetylacetonate and mixtures thereof. Examples of organoaluminum compounds are triethylaluminum, tributylaluminum, triisobutylaluminum, tripropylaluminum, triphenylaluminum, trioctylaluminum, tridodecylaluminum, dimethylaluminum chloride, diethylaluminum bromide, diethylaluminum chloride, dipropyl aluminum fluoride, diisobutyl aluminum fluoride, diethyl aluminum hydride, diisobutyl aluminum hydride, ethyl aluminum dihydride, sodium aluminum tetraethyl and mixtures thereof. A mixture of a dialkyl aluminum halide and an alkyl aluminum halide is particularly useful and is designated an alkyl aluminum sesquihalide. Ethyl aluminum sesquihalide is a particularly useful example of the latter.

Another method of carrying out the polymerization process is to use a two-component catalyst system. In one such system, the insoluble precipitate which is formed by mixing the titanium compound and an organometallic compound is separated from the reaction mixture and then used in combination with an additional organoaluminum compound. The insoluble reaction product which is used in the two component catalyst system is readily separated from the soluble products, when prepared in a diluent, by centrifuging or filtering and may also be washed with a hydrocarbon solvent if desired so as to remove all soluble reaction products.

In each of the processes where titanium and aluminum compounds are present in the catalyst, and these compounds are reacted with an alcohol and then with caustic, the present invention provides a ready and rapid means of removing the residual catalyst from the polymer. The process is applicable to batch or continuous polymerization processes and is of particular value where a filtration is used. Additional inert solvent such as that used in the polymerization may be added before the treatment of the present invention to aid in the subsequent treatment of this invention. Inert solvents which are used in the polymerization and may be added are volatile hydrocarbons or halogenated hydrocarbons such as hexane, heptane, isooctane, cyclohexane, cymene, cumene, xylene, benzene, toluene, chlorobenzene, chloropentanes and analogs thereof. The polymer may constitute as much as 80% of the slurry in the inert solvent or may be diluted further so as to constitute as little as 10% of the slurry.

In the process of this invention, any of the aliphatic alcohols having 1 to about 18 carbon atoms may be used for inactivation of the catalyst and the withdrawal from the pores of the polymer. However, there are certain advantages in using alcohols having 4 to 10 carbon atoms. The preferred alcohols are butanols, pentanols, 3-methyl-1-butanol, n-hexanol and 2-ethyl-1-hexanol.

In the purification process of this invention, the alcohol which is first added reacts with and forms a complex with the catalyst residue. By allowing the polymer to steep for a short while in the alcohol, the alcohol penetrates the polymer particles and forms a soluble complex with any catalyst occluded therein and the soluble complex diffuses out of the polymer particles into the diluent. Since the catalyst residues form a corrosive acid liquor in the presence of water, the alcohol used in the steeping step is preferably low in water content. The catalyst-complex is washed out of the reaction mixture with water containing alkali which neutralizes the acidity and thus reduces the corrosiveness and prevents the pick up of metals from the container or reaction vessel. The aqueous alkali used is contacted with the reaction mixture in the presence of the sodium salt of tartaric acid, citric acid, or gluconic acid and the metals are thus not precipitated as the hydroxides of the metals but are dissolved or highly dispersed. When an excess of alkali is used over that required to produce a pH of about 10 the aluminum is largely in the form of soluble aluminates. The titanium is in the form of oxides or hydroxides which are normally insoluble in alkaline solutions. However, in the process of this invention the organic acid salt prevents precipitation of the aluminum compounds at a pH in the range of about 5–10 and prevents precipitation of titanium compounds at a pH in the range of about 5–12 by forming water dispersible or soluble complexes therewith. Thus an amount of alkali sufficient to dissolve the aluminum hydroxides may be used in a concentration that will keep them in solution, but an amount of alkali salt of the selected organic acid sufficient to suppress precipitation of the metal hydroxides in the alkaline solution is also used in accordance with this invention. The critical limitations of this process are set forth in greater detail hereinafter.

The following specific examples illustrate the process of purifying polyolefins produced by the low pressure processes and the manner in which the present invention is carried out. All parts and percentages are by weight unless otherwise indicated, and parts, weight atoms, and moles are in the same units.

EXAMPLES

In each of these examples ethylene or propylene was polymerized by passing the ethylene or propylene into a mixture of liquid aliphatic hydrocarbons as diluent (boiling point of about 200–240° C.) in contact with a two-component catalyst system at room temperature. The first catalyst component was the hydrocarbon insoluble reaction product obtained by mixing ethylaluminum sesquichloride with titanium tetrachloride in an aliphatic hydrocarbon diluent, the amount of said catalyst component used in the polymerization being equivalent to about 13 millimoles of titanium tetrachloride per 700 parts of diluent. This catalyst component was then used in combination with an additional quantity of ethylaluminum sesquichloride as the second catalyst component, the amount of the latter being added to the polymerization system depending upon the rate of the polymerization, etc., usually being about 6–25 millimoles per 700 parts of diluent. At the end of the polymerization reaction the polymer was in the form of a slurry (about 25% solids of polymer) in the hydrocarbon diluent. The polymer was in the form of fairly dense particles having an average diameter of about 100–300 microns. To the reaction mixture in each case was added n-butanol under an atmosphere of nitrogen and the reaction mixture was agitated. The reaction mixture was then neutralized by adding an aqueous solution of sodium hydroxide to which at least ¼ mol of one of the acids of the group of gluconic acid, tartaric acid, and citric acid per weight atom of metal in the catalyst had been added. The neutralizing aqueous solution was added in sufficient amount to effect an alkalinity as shown by a pH of the aqueous reaction mixture in the range of 7 to about 12. The resulting slurry which was substantially free of insoluble metal hydroxides, was filtered to remove the granular polymer and the polymer was further washed with fresh water to remove occluded mother liquor from the granule surfaces. After this treatment the polymer was steamed and dried. Data on a series of runs are shown in the following table where the percents of reagents used are based on the volume of slurry. Runs marked "b" are corresponding blank runs.

*Table*

| Run | 1a | 1b, 2b | 2a | 3a | 4a | 4b | 5a | 5b |
|---|---|---|---|---|---|---|---|---|
| Polymer | Polyethylene | | | | Polypropylene | | | |
| Polymer Slurry: | | | | | | | | |
| Diluent (Saturated Hydrocarbon, B.P. 200–240° C.), Amount (parts) | 650 | 650 | 650 | 650 | 100 | 100 | 320 | 320 |
| Polymer Amount (parts) | 280 | 357 | 280 | 280 | 44.1 | 44.1 | 85 | 85 |
| Catalyst Residues: | | | | | | | | |
| Ti (Weight Atoms) | .008 | .008 | .008 | .008 | .00184 | .00184 | .004 | .004 |
| Al (Weight Atoms) | .0104 | .008 | .0104 | .0104 | .00077 | .00077 | .0105 | .0105 |
| Cl (Weight Atoms) | .040 | .036 | .040 | .040 | .00668 | .00668 | .026 | .026 |
| Alcohol Treatment: | | | | | | | | |
| Alcohol (n-Butanol)— | | | | | | | | |
| Amount (parts) | 12.5 | 12.5 | 12.5 | 12.5 | 2 | 2 | 10 | 10 |
| Steep time (hours) | 0.5 | 16 | 0.5 | 0.5 | 2 | 2 | 2 | 2 |
| Caustic Treatment: | | | | | | | | |
| Sodium hydroxide (parts) | 1.6 | 10 | 2 | 2 | 0.55 | 0.55 | 5 | 10 |
| Water (parts) | 250 | 250 | 250 | 250 | 33.3 | 33.3 | 100 | 100 |
| Sequestering Acid | | None | | | | None | | None |
| Gluconic Acid (parts) | 6.5 | | | | | | 1.2 | |
| Citric Acid (parts) | | | 3 | | 0.485 | | | |
| Tartaric Acid (parts) | | | | 3 | | | | |

In Example 1a using gluconic acid as the sequestering agent the slurry water was only slightly hazy while without the sequestering agent (1b) it was a milky white suspension, and there was a distinct ease in filtration in Example 1a. The polyethylene from 1a had an average ash content of 0.03% and on repeated runs there was no build-up of ash on the filter. In the corresponding blank, 1b, the average ash content of the polyethylene filtered on a coarse filter on the first run was also 0.03% but in repeat runs there was a build-up of ash on the filter which contaminated the product on reuse of the filter.

Example 2a only differs from Example 1a in substituting citric acid for gluconic acid and in using 2 parts sodium hydroxide and 3 parts citric acid for the caustic treatment. The ash in the polymer at the filter cloth was 0.82% on the first run and this diminished to 0.35% on the fourth run reusing the filter cloth. In the blank using no sequestering agent (2b), the ash content of the polymer at the filter cloth was 0.93% in the first run and 5.0% on the second run reusing the filter cloth.

Example 3a is a repetition of Example 2a using tartaric acid in place of citric acid. Similar results showed that there is improved ease of handling and, due to lack of precipitation of metal hydroxides, much less build-up of ash at the filter when tartaric acid is used as a sequestering agent than when it is not used. While tartaric acid and citric acid were about equal in effectiveness, the amount required to show equal effectiveness with gluconic acid was about double that of gluconic acid.

Example 4a was repeated 15 times in direct comparison with 15 blanks (4b) in which sodium gluconate was omitted. The average ash content of the polypropylene in 4a using gluconic acid was 0.034% while in 4b, where the water was decanted prior to a final filtration to remove the precipitate which formed in the absence of gluconic acid, the average ash content was 0.099%. Repetition of Example 4a using isopropyl and isobutyl alcohol as substitutes for n-butyl alcohol showed good but not equivalent results.

Example 5a was repeated three times and the ash was determined on the wet unwashed polypropylene in the center of the filter cake and at the filter cloth. The ash content at the filter cloth was only slightly higher than in the center of the cake and remained constant showing no build-up of ash at the filter cloth. The average ash of the water-washed and dried polypropylene was 0.09%. In blank run 5b using no gluconic acid the ash built up on the filter and the polypropylene had to be reslurried and decanted several times to reduce the average ash content to as low as 0.1%.

The ash in the polymer is found to vary on the product as taken from the filter from a high figure on the material nearest the filter cloth to a low figure farthest from the filter. Thus by reslurrying and refiltering on a clean filter the average ash content is reduced to a negligible figure.

The amount of organic acid used as the sequestering agent is calculated from the total amount of aluminum and titanium in the catalyst, and is in the range of at least 0.5 to 2 times the weight of such metal. The organic acid may be introduced as the salt or as the free acid. If measured as the alkali metal salt, the alkali metal so introduced will reduce the amount of alkali metal hydroxide needed in the caustic solution. If introduced as the free acid, the acid will neutralize part of the caustic but the caustic so used up will be available in the reaction for neutralizing halide and thus will not make any material difference in preliminary calculations of the amount required. An excess of the organic acid over that required for preventing precipitation of the metal hydroxides which are not soluble in caustic may be used without harmful effects but is not necessary.

The caustic and sequestering acid may be added in aqueous solution together or they may be added separately in either order. Moreover, the sequestering acid may be added with the alcohol prior to the steeping step. However, the acid is preferably added together with or prior to the caustic so as to get the greatest benefit of the improved process.

The concentration of the caustic solution with respect to alkali metal hydroxide is critical in that the concentration must be less than about 4% based on the weight of the water. The amount of caustic used is sufficient to neutralize the acidity of the catalyst and give the resulting solution after reaction with the catalyst a pH in the range of about 5 to about 12. This amount is readily determined by titration. A caustic solution exceeding about 4% concentration or a pH greater than about 12 may cause the precipitation of metal hydroxides. On the other hand it is desirable that the concentration of caustic be adequate to solubilize all of the aluminum hydroxide. The amount of caustic is calculated from the amount of catalyst components, a molecule of caustic being required for each atom of halogen or other anion and each atom of amphoteric metal which will form a sodium salt at pH 5–12 in the catalyst mixture. A slight excess of caustic is desirable but not more than would give the liquor a pH greater than about 12.

The amount of water in the slurry after adding the caustic solution will be in the range of 15 to 300% of the weight of the polymer in the slurry and, if desired, water in addition to that introduced with the caustic solution may be added to increase the amount of water to an amount within this range.

The amount of alcohol used in the steeping treatment of this invention may be varied widely from about 1% to about 300% of the polymer. The amount may be varied as desired for making a more fluid slurry when insufficient inert solvent from the polymerization is present for satisfactory fluidity.

The temperature for the alcohol steeping treatment may vary widely, 0° to 100° C. being a useful range and pressure may be used if desired to prevent loss of alcohol. The practical temperature range is about 50–80° C., however. The time of this treatment will likewise vary over a wide range. As short a period of time as 10 minutes is beneficial and 30 minutes is adequate for most purposes but it is often practical to allow the steeping treatment to continue several hours. Because of the activity of the catalyst, air and water are preferably excluded at least until the catalyst is deactivated by the alcohol. An inert atmosphere may be substituted for air during this treatment.

The treatment with caustic and sequestering acid and subsequent washes with water is carried out in the same temperature range as the alcohol treatment, and the temperature is not critical.

The spent liquor after the treatment with caustic and sequestering acid is separated in any suitable manner as by filtration, decantation, centrifugation and the like. The improved process is, however, particularly adapted for use in filtration or centrifuging. The organic layer of hydrocarbon or other inert solvent may be recovered from the aqueous layer and the alcohol may be recovered for reuse in any suitable manner. The polymer may be further washed with water containing wetting agents or sequestering agents if desired for further purification. The polymer may also be further treated to remove any occluded inorganic material, volatile organic material, or diluent that may remain in the pores of the polymer. Many other variations of the process will be obvious to one skilled in the art.

The process of this invention is not limited to any specific Ziegler catalyst but is applicable to purification of polymers made from any of the Ziegler catalysts wherein the catalyst residues to be removed are titanium and aluminum.

What we claim and desire to protect by Letters Patent is:

1. In the process of polymerizing an ethylenically unsaturated hydrocarbon with a catalyst comprising a titanium compound selected from the group consisting of titanium halides, titanium acetylacetonates and mixtures thereof, and an organoaluminum compound selected from the group consisting of aluminum hydrocarbons, aluminum hydrocarbon halides, aluminum hydrocarbon hydrides and mixtures thereof, whereby the polymer is obtained in the form of granules, within which catalyst particles are enclosed, the improvement in recovery and purification of the polymer which comprises the steps of steeping the polymer in an inert solvent slurry of a concentration of about 10% to 80% polymer with an aliphatic alcohol of 1 to 18 carbon atoms in an amount in the range of 1 to 300% of the weight of the polymer to form a complex solution of the catalyst dispersed in the slurry and in the polymer granules, subsequently contacting the slurry containing the complex solution of the catalyst and polymer with a solution of an alkali metal hydroxide and an alkali metal salt of an organic acid of the group consisting of gluconic acid, tartaric acid, and citric acid in water, the concentration of the alkali metal hydroxide being less than 4%, based on the weight of the water and the amount being sufficient to react with the catalyst and produce a pH of 5 to 12 in the aqueous solution, the amount of the organic acid being at least 0.5 to 2 times the weight of the metals of the catalyst in the slurry and the amount of water being 15 to 300% of the weight of the polymer in the slurry.

2. The process of claim 1 in which the olefin polymer is polyethylene.

3. The process of claim 1 in which the olefin polymer is polypropylene.

4. The process of claim 1 in which the olefin polymer is polybutene-1.

5. The process of claim 1 in which the aliphatic alcohol used has 4–10 carbon atoms.

6. The process of claim 2 in which the aliphatic alcohol is a butyl alcohol.

7. The process of claim 3 in which the aliphatic alcohol is a butyl alcohol.

8. The process of claim 1 in which the alkali metal salt of an organic acid is an alkali metal gluconate.

References Cited in the file of this patent

UNITED STATES PATENTS

| | | |
|---|---|---|
| 2,814,610 | Braidwood et al. | Nov. 26, 1957 |
| 2,827,447 | Nowlin et al. | Mar. 18, 1958 |
| 2,867,612 | Pieper et al. | Jan. 6, 1959 |
| 2,867,643 | Hamprecht et al. | Jan. 6, 1959 |
| 2,905,645 | Anderson et al. | Sept. 22, 1959 |
| 2,905,659 | Miller et al. | Sept. 22, 1959 |
| 2,912,420 | Thomas | Nov. 10, 1959 |
| 2,919,264 | Frese et al. | Dec. 29, 1959 |